United States Patent [19]
Bye et al.

[11] Patent Number: 5,287,344
[45] Date of Patent: Feb. 15, 1994

[54] TRANSFERRING LINES IN A DIGITAL LOOP CARRIER TRANSMISSION SYSTEM

[75] Inventors: Peter L. Bye, Livingston; James H. Miller, Randolph Township, Morris County; Eva Ronnen, Ocean Township, Monmouth County; Steven P. Spencer, Livingston, all of N.J.

[73] Assignee: AT&T Bell Laboratories, Murray Hill, N.J.

[21] Appl. No.: 710,474

[22] Filed: Jun. 5, 1991

[51] Int. Cl.5 .............................................. H04Q 11/00
[52] U.S. Cl. ........................................ 370/16; 370/56; 379/334
[58] Field of Search ................... 370/16, 17, 56, 58.1, 370/58.2, 58.3, 68.1, 110.1, 53; 379/221, 212, 232, 240, 269, 334, 220, 335; 340/825.03, 827

[56] References Cited
U.S. PATENT DOCUMENTS

| | | | |
|---|---|---|---|
| 4,403,320 | 9/1983 | Canniff | 370/56 |
| 5,105,420 | 4/1992 | Ardon et al. | 379/269 |
| 5,138,657 | 8/1992 | Colton et al. | 379/220 |

OTHER PUBLICATIONS

*Reliance Comm/Tec Practice*, DISC*S 1 Digital Loop Carrier System General Description, Section 363-25-0-100 (Sep. 1987).

Primary Examiner—Benedict V. Safourek
Assistant Examiner—Hassan Kizou
Attorney, Agent, or Firm—Lester H. Birnbaum

[57] ABSTRACT

Proposed is a method and system for transferring end customer phone lines between different terminations at the central office. Transfer is accomplished through the creation of virtual remote terminals of a desired size and number at the remote terminal and an appropriate mapping of the channel units to these virtual remote terminals.

10 Claims, 5 Drawing Sheets

TRANSFERRING LINES IN A DIGITAL LOOP CARRIER TRANSMISSION SYSTEM

BACKGROUND OF THE INVENTION

This invention relates to digital loop carrier transmission systems.

In present digital loop carrier transmission systems, such as the Subscriber Loop Carrier (SLC ®) Series 5 system, data communications take place between a switching entity at the central office (CO) and a remote terminal (RT) in the field. A "switching entity" is defined as a part of a switch that includes call processing capability plus a portion of the switching network. Each switching entity has a traffic-handling capacity which can be reached when the number and duration of calls to and from the remote terminal attain a certain level. It is often desirable, therefore, to move customer lines to different switching entities in order to balance the load on the different parts of the central office switch. In typical prior art systems, all customer lines in a remote terminal would be moved to a new switching entity. This meant that if a transfer of RT/CO feeder facilities to the new switching entity was performed halfway through the CO data transfer process, the average customer would be without telephone service for the time it takes to transfer one-quarter of all customers' data to the new switching entity. Alternatively, such load balancing problems could be handled by switch hardware and software modifications, but this approach was expensive.

Digital loop carrier systems presently employed in the United States conform to one of two standards for interfacing with the digital switches. The older standard, known generally in the industry as TR8, allows a remote terminal with no more than 96 customer lines. The newer standard, known as TR303, is compatible with remote terminals ranging from 48-2048 lines. In the case of TR8 systems, where it is desired to increase the number of lines to a remote terminal to greater than the allowed 96 lines, it has been proposed that a plurality of "virtual" remote terminals be set up at each remote terminal site. That is, each switching entity could be coupled to one of a plurality of virtual remote terminals set up within one physical remote terminal, and the channel units at that terminal could be mapped to any of the virtual terminals through a time slot interchanger. The result is that each remote terminal, while physically a single entity, would function in relationship to the central office as if it were a plurality of separate terminals. Since each virtual terminal in TR8 is limited to 96 lines, however, the load balancing issue has not been addressed.

It is, therefore, an object of the invention to provide a mechanism for transferring phone lines among central office switch components with reduced per customer outage time.

SUMMARY OF THE INVENTION

This and other objects are achieved in accordance with the invention which, in one aspect, is a method, in a digital loop carrier transmission system, of transferring a customer line at a remote terminal between terminations at a central office. At least two virtual terminals are established at the remote terminal, each virtual terminal including a separate data link to an associated central office termination. The customer line is mapped to both of the virtual terminals, but the mapping to only a single virtual terminal is responsive at any given time to voice and data transmission from its associated central office termination. The mapping to said single virtual terminal is decoupled, and the mapping to the other virtual terminal is activated so that only the mapping to the said other virtual terminal is responsive to voice and data transmission from its associated central office termination.

In accordance with another aspect, the invention is apparatus for transferring customer lines at a remote terminal between terminations at a central office. The apparatus comprises at least two virtual terminals, each having data links for connection to associated terminations at a central office, a concentration network coupled to the data links and having a plurality of logical lines for coupling to end customer lines at the remote terminal, and a control memory for storing mapping information between the end customer lines and logical lines. The apparatus also includes means for connecting logical lines of the virtual terminals to the end customer lines in accordance with the mapping information stored in the control memories, and means for switching the connecting means between the two control memories.

BRIEF DESCRIPTION OF THE DRAWING

These and other features are delineated in detail in the following description. In the drawing.

DETAILED DESCRIPTION

Figure 1:
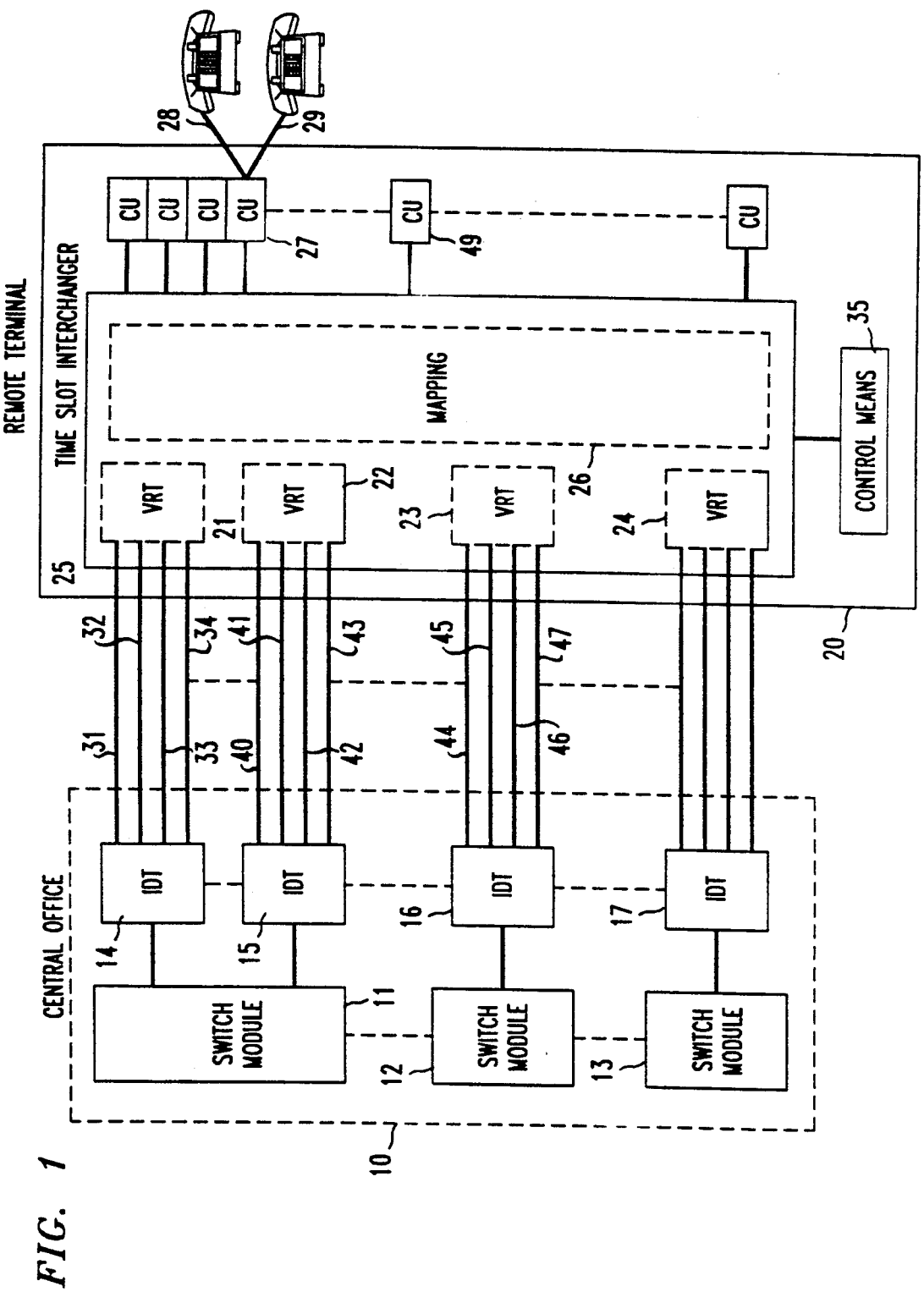
FIG. 1 is a block diagram illustrating portions of a digital loop carrier transmission system in accordance with the invention.

FIG. 1 illustrates in block form certain components of a digital loop carrier transmission system incorporating the features of the invention. A central office, 10, includes a plurality of switching entities, such as 5ESS ® switch modules shown as 11-13, each coupled to a plurality of terminations such as Integrated Digital Terminals (IDT) some of which are shown as blocks 14-17. Typically, there are one or more IDTs coupled to each switch module.

The IDTs are coupled to the remote terminal, 20, through a series of lines, known in the art as feeder digroups, with each feeder digroup having 24 channels. A typical TR303 system would have 2-28 feeder digroups and a typical TR8 system would have 2 or 4 feeder digroups.

In the embodiment shown, each IDT is coupled to an associated virtual remote terminal (VRT) indicated by the phantom blocks 21-24. The reason these blocks are shown in phantom is that the concentration networks of these virtual terminals may be implemented within a single time slot interchanger 25 which includes a mapping function (block 26) to be described. Each IDT is coupled to its associated virtual terminal, in this example, by means of four feeder digroups, such as 31-34. At least one of the four feeder digroups coupling each IDT includes a data link which is separate from any data link between any other IDT and its associated VRT. Consequently, each IDT operates as if it were coupled to a separate terminal.

The remote terminal also includes a plurality of channel units, such as 27, with each channel unit serving one or more subscriber lines, e.g., 28 and 29. Each channel unit is coupled to the central office through the time slot interchanger 25. Each IDT at the central office would normally connect designated channel units, typically 48 or more in number, to the central office switch. In accordance with a feature of the invention, virtual remote terminals (21-24) of arbitrary line size can be created and the channel units coupled to different ones of the VRTs to achieve the proper load balancing. This is accomplished through the mapping function, 26, which will be described below.

There are actually two types of mappings that should be accomplished in this system since each IDT considers itself to be coupled to a single, separate remote terminal. That is, a mapping must be done between what the IDT considers to be the logical feeder digroup number and the physical feeder digroup number. In addition, a mapping must also be done between what the IDT considers to be the logical channel unit number and the physical channel unit number. Assume, for example, that a call is made through IDT 15 on the feeder digroup designated in FIG. 1 as 40, and the call is destined for a customer on the channel unit designated 49. The command from the central office would be to connect feeder digroup number 1 for that IDT to channel unit number 1 of VRT 22 (assuming for example that channel unit 49 is the first unit coupled to VRT 22). The remote terminal, therefore, must be able to translate what the IDT considers to be the first feeder digroup into the actual physical digroup for the entire terminal, which in this case is feeder digroup number 5. Similarly, the remote terminal must translate what the IDT considers to be the number of the channel unit into the actual number of the unit in the terminal, which in this case would be channel unit number 49, assuming that the first 48 channel units are coupled to VRT 21.

The mapping function is controlled by memories, 35, which store the correspondence between logical and physical feeder digroups and between logical and physical channel units.

Figure 2:
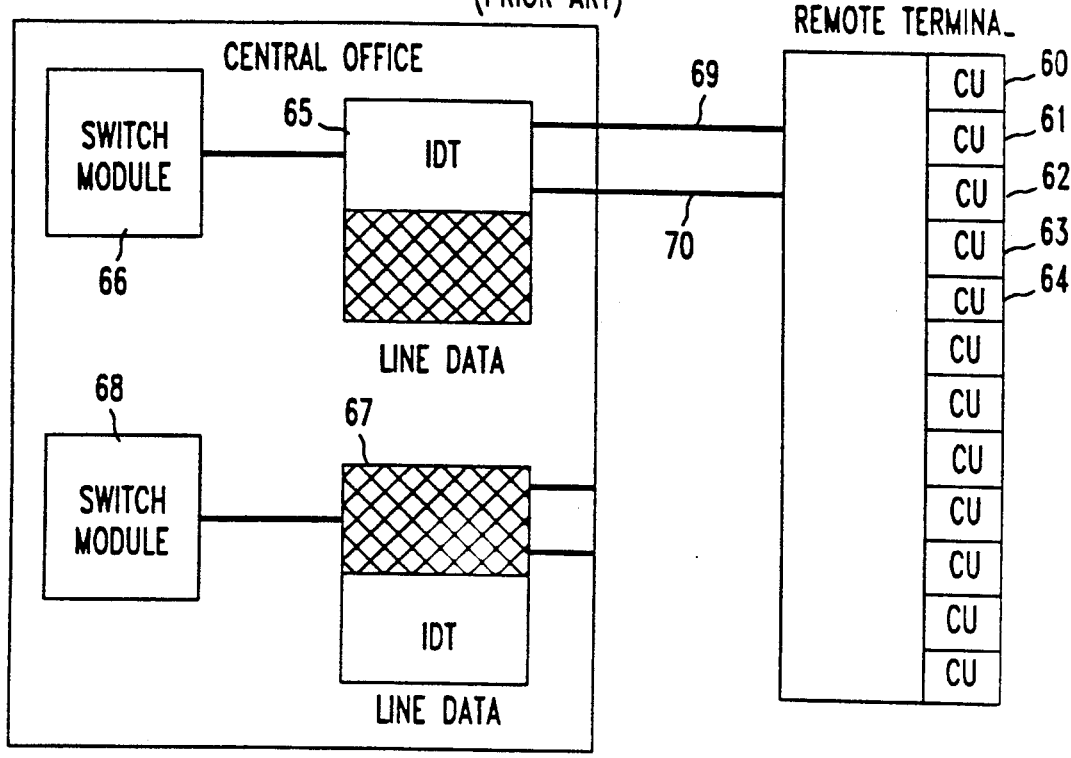
FIGS. 2-3 are block diagrams illustrating transferring of customer lines in accordance with the prior art.
Figure 3:
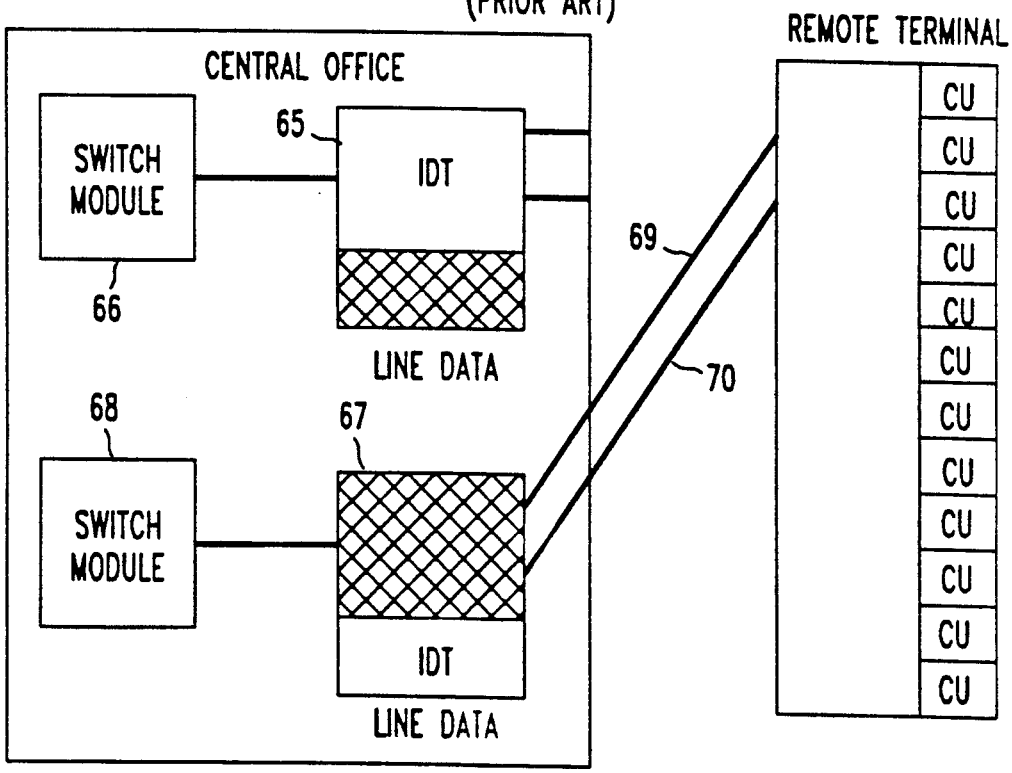

The mapping function can be utilized to achieve quick transfer of customer lines among different switch terminations (IDTs) at the central office. The benefit of this feature is demonstrated by reference to a typical prior art approach illustrated in FIGS. 2-3. In FIG. 2, it is desired to transfer all the channel unit circuits, e.g., 61-64, at the remote terminal from an IDT 65 of a switch module 66 which is overloaded to an IDT 67 of a switch module 68 with spare capacity. Each line of data in the IDT associated with a customer would need to be transferred from the "old" IDT 65 to the "new" IDT 67. In order to minimize the outage time, the feeder digroups, two of which are shown in this example as 69 and 70, would remain connected to the old IDT 65 until the data for approximately one-half the customers was transferred. (The block of data representing the transferred line data is shaded in IDT 67 and the block of data remaining in IDT 65 is also shaded.) At this halfway point, as shown in FIG. 3, the feeder digroups 69 and 70 would be moved from IDT 65 to IDT 67. The remainder of the line data would then be transferred between IDT 65 and IDT 67. Thus, an individual customer could be disconnected for up to one-half the time it takes to transfer all line data between the IDTs.

Figure 4:
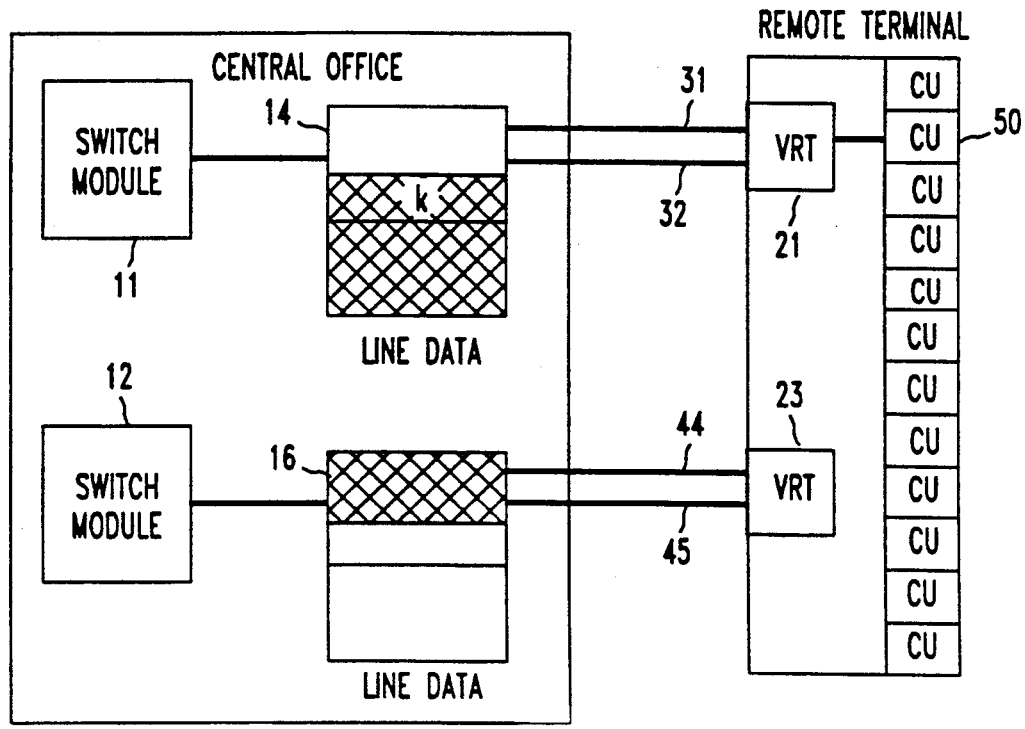
FIGS. 4-5 are block diagrams illustrating transferring of customer lines in accordance with an embodiment of the invention.
Figure 5:
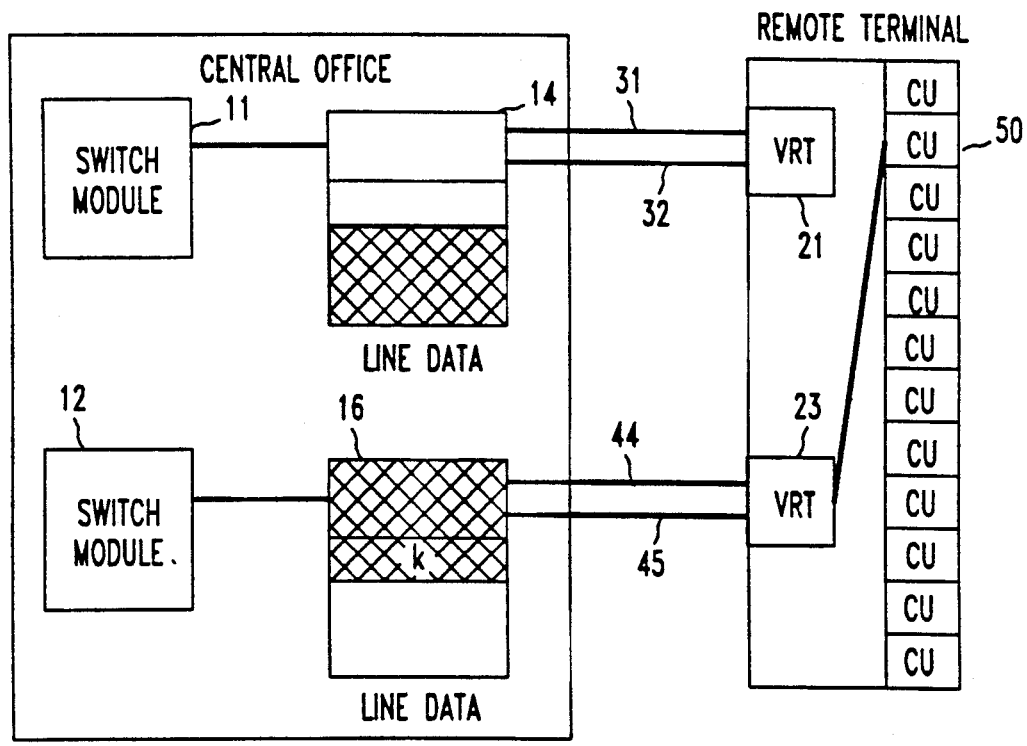

In accordance with a feature of the invention, this outage time can be reduced considerably as illustrated in the diagrams of FIGS. 4 and 5, where elements corresponding to those of FIG. 1 are similarly numbered. (For the sake of clarity, only two feeder digroups are shown coupled to each IDT.) At the point illustrated in FIG. 4, it is assumed that all channel units that are drawn above unit 50 at the remote terminal 20 have been transferred from IDT 14 associated with switch module 11 to IDT 16 associated with switch module 12.

Virtual remote terminal 21 is connected to IDT 14 by feeder digroups 31 and 32, while virtual remote terminal 23 is simultaneously connected to IDT 16 by feeder digroups 44 and 45. The channel unit, 50, up until this point continues to operate through virtual terminal 21, with the line data for this channel unit indicated by block "K" in IDT 14.

When it is desired to transfer the line data "K" to the IDT 16 as illustrated in FIG. 5, the channel unit 50 is electronically disconnected from virtual remote terminal 21 and electronically connected to virtual remote terminal 23. This procedure is followed for each of the channel units which are transferred. Thus, each end customer is out of service only for the time it takes to transfer his or her data between switch modules in the central office.

Figure 6:
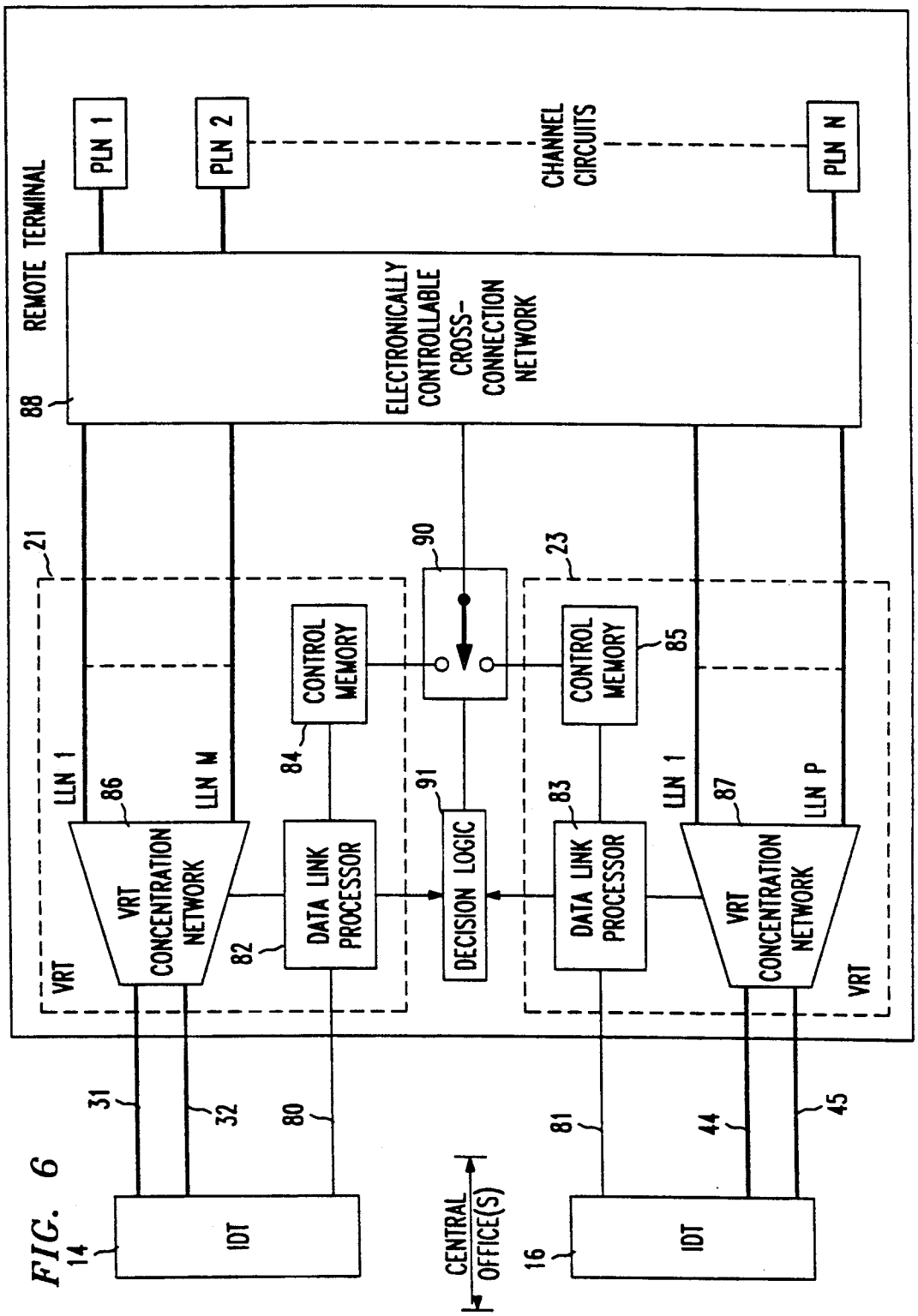
FIG. 6 is a more detailed block diagram of certain features of the digital loop carrier transmission system in accordance with an embodiment of the invention.
Figure 7:
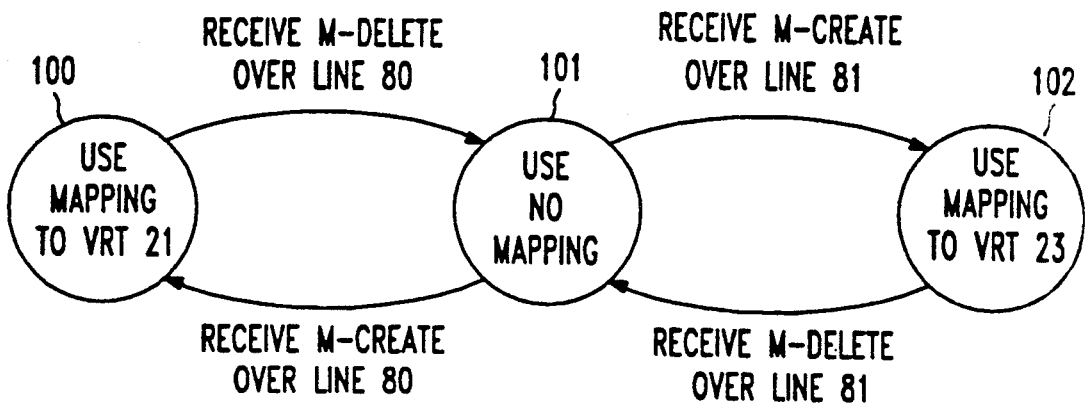
FIGS. 7 and 8 are state diagrams for the system illustrated in FIG. 6.
Figure 8:
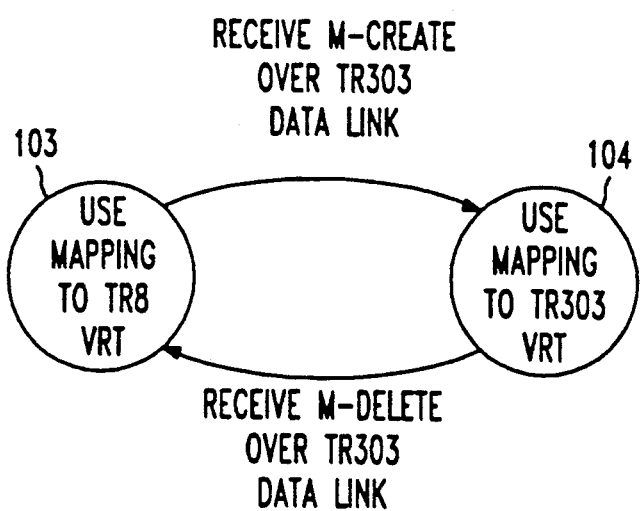

FIG. 6 is a more detailed functional block diagram of a portion of the system of FIG. 1 designed to illustrate, along with the state diagrams of FIGS. 7 and 8, how end customer channel unit circuits, now designated by Physical Line Numbers (PLN 1 to PLN N), can be transferred from one IDT, 14 to another IDT, 16. For purposes of clarity, only two feeder digroups 31, 32 and 44, 45 are shown coupled between each IDT, 14 and 16, and its associated virtual remote terminal, 21 and 23. While typically part of the feeder digroup, for clarity a separate line, 80 and 81, is shown for providing control signals between each IDT/VRT pair (14/21 and 16/23, respectively). Each control line, 80 and 81, is coupled to a data link processor, 82 and 83, respectively, which in turn is coupled to an associated control memory, 84 and 85, respectively. The data link processors 82 and 83 are also coupled to respective VRT concentration networks 86 and 87. Each concentration network couples the feeder digroups 31, 32 and 44, 45 to two separate series of logical line numbers LLN 1 to LLN M and LLN 1 to LLN P, respectively, where M and P are typically both greater than the number of channels in the feeder digroup. Each logical line is coupled to a physical channel circuit identified by physical line numbers PLN 1-PLN N through the electrically controllable cross-connect network 88. The correspondence of the physical lines to the logical lines for each virtual remote terminal 21 and 23 is determined by the mappings stored in their corresponding control memories 84 and 85.

In accordance with a feature of the invention, each physical line (PLN 1-PLN N) has mappings to both virtual remote terminals 21 and 23. However, the mapping for each line presented to the central office at any given time will be dependent upon which control memory, 84 or 85, is coupled to the cross-connection network 88 for that particular line. Thus, the control memories are coupled to the cross-connection network 88 through some means, illustrated as a switch 90, which can connect and disconnect the control memory separately for each individual physical line. This switch is controlled by decision logic illustrated as box 91 based on signals from the data link processors 82 and 83.

It is assumed initially that each of the physical lines, PLN 1–PLN N, is coupled to the IDT 14 at the central office. That is, control memory 84 at the remote terminal is coupled to the cross-connection network 88 through switch 90 so that each physical line PLN 1 to PLN N is mapped to a logical line, LLN 1 to LLN M, on virtual remote terminal 21. For TR303 systems, this mapping is activated when each customer line is first put into service by an EOC (Embedded Operations Channel) message (M-create) from the IDT over the control link 80. Similarly, each time a customer line is put out of service, the IDT sends an EOC message (M-delete) to the remote terminal to disconnect that line.

The present invention makes use of these already existing messages in the TR303 interface specification to provide the transfer between IDTs 14 and 16 as will now be described with further reference to the state diagram of switch 90 which is illustrated in FIG. 7. In the state illustrated by circle 100, switch 90 couples control memory 84 to the cross-connection network 88 so that mapping is applied to VRT 21. M-delete messages are then sent from IDT 14 over line 80 for each PLN in sequence. Each message is decoded by the data link processor 82, and is then used to decouple switch 90 for each PLN to which the message corresponds to achieve the state of "no mapping" illustrated by circle 101. Thus, at this stage, an individual PLN is not connected to the central office. However, once the data at the central office for a particular line is transferred from IDT 14 to IDT 16, an M-create message is then sent on line 81. This message is decoded by processor 83 in order to couple the data in control memory 85 to the cross-connection network 88. This results in the state illustrated by circle 102 where the PLN is now mapped to VRT 23. The M-delete messages and M-create messages continue until all PLNs are "decoupled" from VRT 21 and are "coupled" to VRT 23 at which time the feeder digroups, 31 and 32, to VRT 21 may be disconnected. It will be appreciated that, by this technique, each end customer is out of service (no mapping state) only for the time it takes to transfer his or her data from IDT 14 to IDT 16, and is independent of the total time it takes to move all customers' data between the IDTs. The time for customer outages is, therefore, significantly reduced.

In cases where a transfer is desired between a VRT which is coupled via a TR8 interface and a VRT which is coupled to a TR303 interface, the state diagram of FIG. 8 applies. Since the TR8 interface does not include M-create and M-delete messages, reliance is placed only on the data link to the TR303 interface. Assume that the initial VRT (21) uses the TR8 specification and the final VRT (23) uses the TR303 specification. Thus, in the initial state, illustrated by circle 103, the mapping of the VRT (21) coupled to the TR8 interface is utilized. As each line of data at the central office is transferred to the IDT with the TR303 interface, an M-create message is sent over the data link coupled between the TR303 interface and VRT 23 at the remote terminal. At that time, the customer is mapped to the VRT coupled to the TR303 interface as illustrated by circle 104. Similarly, if it is desired to transfer from a VRT coupled to a TR303 interface to a VRT coupled to a TR8 interface, an M-delete message is sent over the data link between the former VRT and the TR303 IDT.

As an alternative to using M-create and M-delete messages, it may be possible to activate the mapping by receipt of a terminating call for that line from the new switching entity.

While the above method has been described with regard to transferring all lines from one switch IDT to another, it will be appreciated that the technique can be used to transfer any desired number of lines between switches, switching entities or terminations. Further, any number of virtual remote terminals mapped to any desired number of lines can be created at the remote terminals in accordance with the invention.

Various additional modifications of the invention will become apparent to those skilled in the art. All such variations which basically rely on the teachings through which the invention has advanced the art are properly considered within the scope of the invention.

We claim:

1. In a digital loop carrier transmission system, a method for transferring at a remote terminal a customer line at said remote terminal between terminations at a central office comprising the steps of:
   providing at least first and second virtual terminals at the remote terminal, each virtual terminal including a separate data link to an associated central office termination;
   mapping the customer line to both of said virtual terminals, the mapping to only the first virtual terminal being active to provide voice and data transmission between the customer line and the central office termination associated with the first virtual terminal; and
   deactivating the mapping to said first virtual terminal and activating the mapping to said second virtual terminal so that only the mapping to said second virtual terminal provides voice and data transmission between the customer line and the central office termination associated with the second virtual terminal.

2. The method according to claim 1 wherein the customer line is coupled to the virtual remote terminals through a cross-connection network, the mappings to the virtual terminals are stored in different control memories in the remote terminal, and the mapping to the first virtual terminal is deactivated and the mapping to the second virtual terminal is activated by switching control of the cross-connection network from one control memory to another.

3. The method according to claim 1 wherein the terminations are coupled to different switch entities at the central office.

4. The method according to claim 1 wherein the remote terminal includes a plurality of customer lines, each line is mapped to both of said virtual terminals, and the lines are transferred in succession between the central office terminations.

5. The method according to claim 4 wherein one of said virtual terminals is disconnected from its associated central office termination after all lines have been transferred to the central office termination associated with the other virtual terminal.

6. The method according to claim 1 wherein the mapping to said first virtual terminal is deactivated in response to a control signal from the central office termination associated with the said first virtual terminal, and the mapping to the second virtual terminal is activated in response to another control signal from the central office termination associated with the second virtual terminal.

7. The method according to claim 1 wherein the mapping to said first virtual terminal is deactivated and activated in response to a single control signal from one of the central office terminations associated with one of the virtual terminals.

8. Apparatus for transferring at a remote terminal customer lines at said remote terminal between terminations of a central office comprising:

at least two virtual terminals, each having data links for connection to an associated central office termination, a concentration network coupled to said data links and having a plurality of logical lines for coupling to customer lines at the remote terminal, and a control memory for storing mapping information between the customer lines and logical lines;

a cross-connection network for connecting logical lines of the virtual terminal to the customer lines in accordance with the mapping information stored in the control memory; and means for switching control of the cross-connection network from one control memory to another.

9. Apparatus according to claim 8 wherein the concentration networks and cross-connection network comprise a time slot interchanger.

10. Apparatus according to claim 8 wherein each virtual terminal further comprises a data link processor for decoding control signals from the associated central office termination and coupled to the switching means to control the switching of control of the cross-connection network from one control memory to another.

* * * * *